United States Patent
Chen et al.

(10) Patent No.: US 7,633,574 B2
(45) Date of Patent: Dec. 15, 2009

(54) PIXEL STRUCTURE AND METHOD OF MAKING THE SAME

(75) Inventors: Maw-Song Chen, Hsin-Chu (TW); Chih-Hung Shih, Hsin-Chu (TW); Yi-Chen Chiang, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 155 days.

(21) Appl. No.: 12/043,137

(22) Filed: Mar. 6, 2008

(65) Prior Publication Data
US 2009/0174833 A1    Jul. 9, 2009

(30) Foreign Application Priority Data
Jan. 9, 2008    (TW) .............................. 97100806 A

(51) Int. Cl.
*G02F 1/13*    (2006.01)
*G02F 1/133*   (2006.01)

(52) U.S. Cl. .................. 349/44; 349/141; 349/142; 349/38; 349/187; 438/29; 257/E21.535

(58) Field of Classification Search .............. 349/141, 349/138, 44, 29, 40, 52, 142, 143, 147, 152, 349/158, 160, 187, 38; 257/E21.535; 438/29
See application file for complete search history.

(56) References Cited

U.S. PATENT DOCUMENTS

| | | | |
|---|---|---|---|
| 6,738,109 B2 * | 5/2004 | Jeon | 349/43 |
| 7,016,005 B2 * | 3/2006 | Koike | 349/144 |
| 7,092,047 B2 * | 8/2006 | Jeon | 349/43 |
| 7,129,520 B2 * | 10/2006 | Kim | 257/48 |
| 2005/0110932 A1 * | 5/2005 | Chang et al. | 349/141 |
| 2005/0280747 A1 | 12/2005 | Nakayoshi | 349/38 |
| 2006/0061700 A1 | 3/2006 | Chung | 349/38 |
| 2009/0174833 A1 * | 7/2009 | Chen et al. | 349/44 |

* cited by examiner

*Primary Examiner*—Brian M Healy
(74) *Attorney, Agent, or Firm*—Winston Hsu

(57) ABSTRACT

A pixel structure includes a substrate, a floating light-shielding pattern disposed on the substrate, an insulating layer disposed on the substrate and the light-shielding pattern, a data line disposed over and corresponding to the light-shielding pattern, a dielectric layer disposed on the data line and the insulating layer, and a third layer conductive pattern disposed on the dielectric layer. The third layer conductive pattern includes a common line and a common pattern. The common pattern includes two common branches arranged in parallel, and there is a space between the two common branches and over the data line.

16 Claims, 10 Drawing Sheets

PIXEL STRUCTURE AND METHOD OF MAKING THE SAME

BACKGROUND OF THE INVENTION

1. Field of the Invention

The present invention relates to a pixel structure and method of making the same, and more particularly, to a pixel structure having high aperture ratio and method of making the same.

2. Description of the Prior Art

Pixel aperture ratio of an LCD device directly influences the utilization rate of backlight and display brightness. One of the major factors that decide the aperture ratio is the distance between the transparent pixel electrode and the data line, and this distance must be reduced if a larger aperture ratio is desired. However, if the transparent pixel electrode and the data line are too approximate, the parasitic capacitance between pixel and data line (Cpd) will increase. When the Cpd increases, the charges charged in the pixel electrode will lead to cross talk when different voltage signals are delivered by the data line. In addition, if the common line and the data line are too approximate, the parasitic capacitance between the common line and the data line will also increase. This may also lead to cross talk.

In order to reduce the effect of parasitic capacitance, many solutions have been proposed. For example, increasing the storage capacitor may reduce the ratio of the parasitic capacitance to all the capacitors in a sub-pixel. Nevertheless, this solution influences the aperture ratio.

SUMMARY OF THE INVENTION

It is therefore one objective of the claimed invention to provide a pixel structure and method of making the same to improve aperture ratio and reduce parasitic capacitor.

In order to achieve the above objective, a pixel structure is provided. The pixel structure includes a substrate, a first layer conductive pattern disposed on the substrate, an insulating layer disposed on the first layer conductive pattern and the substrate, a second layer conductive pattern disposed on the insulating layer, a dielectric layer disposed on the second layer conductive pattern and the insulating layer, and a third layer conductive pattern disposed on the dielectric layer. The first layer conductive pattern includes a gate, a scan line, and a light-shielding pattern, wherein the gate is electrically connected to the scan line. The second layer conductive pattern includes a data line, a source and a drain, wherein the data line is disposed over the light-shielding pattern, and electrically connected to the source. The third layer conductive pattern includes a common line and a common pattern, wherein the common pattern has two branches with a space therebetween, and the space is disposed over the data line.

In order to achieve the above objective, a method of making pixel structure is further provided. First, a substrate is provided, and a first layer conductive pattern is formed on the substrate. The first layer conductive pattern includes a gate, a scan line and a light-shielding pattern, wherein the gate is electrically connected to the scan line. Then, an insulating layer is formed on the first layer conductive pattern and the substrate, and a second layer conductive pattern is formed on the insulating layer. The second layer conductive pattern includes a data line, a source and a drain, wherein the data line is disposed over the light-shielding pattern, and electrically connected to the source. Subsequently, a dielectric layer is formed on the second layer conductive pattern and the insulating layer, and a third layer conductive pattern is formed on the dielectric layer. The third layer conductive pattern includes a common line and a common pattern, the common pattern has two branches with a space therebetween, and the space is disposed over the data line.

In order to achieve the above objective, a pixel structure disposed on a substrate having an active device region and a data line region is provided. The pixel structure includes a first layer conductive pattern disposed on the substrate, an insulating layer disposed on the first layer conductive pattern and the substrate, a second layer conductive pattern disposed on the insulating layer, a dielectric layer disposed on the second layer conductive pattern and the insulating layer, and a third layer conductive pattern disposed on the dielectric layer in the data line region. The first layer conductive pattern includes a gate and a light-shielding pattern, wherein the gate is disposed in the active device region, and the light-shielding pattern is disposed in the data line region. The second layer conductive pattern includes a data line, a source and a drain, wherein the data line is disposed over the light-shielding pattern in the data line region, the source and drain are disposed in the active device region, and the source and drain are respectively disposed over two opposite sides of the gate and partially overlapping with the gate. The dielectric layer exposes the drain in the active device region. The third layer conductive pattern is disposed over two opposite edges of the data line and overlapping with the light-shielding pattern.

The pixel structure of the present invention uses the light-shielding pattern of the first layer conductive pattern to block the light leakage on the edges of the data line of the second layer conductive pattern, and uses the common pattern of the third layer conductive pattern to shield the parasitic capacitor between the pixel electrode and the data line. Furthermore, the branches of the common pattern have a space therebetween, which reduces cross talk due to the parasitic capacitor between the common pattern and the data line. In addition, the two branches of the common pattern, the pixel electrode and the passivation disposed therebetween can form storage capacitor so that excessive storage capacitance is no longer required in the display region of the pixel structure. This makes the pixel structure of the present invention have a very high aperture ratio.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
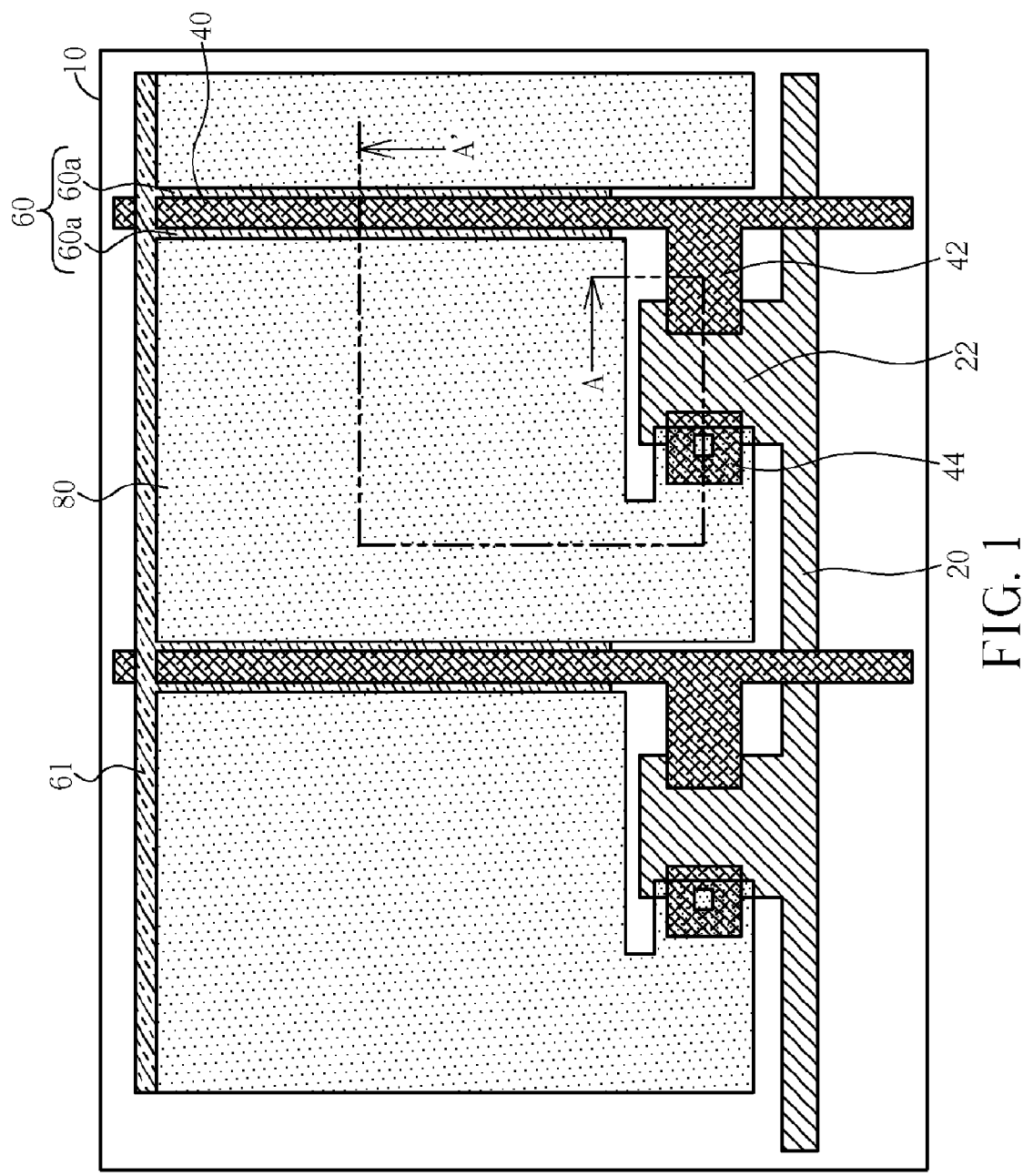
FIG. 1 is a top-view of a pixel structure according to a preferred embodiment of the present invention.
Figure 2:
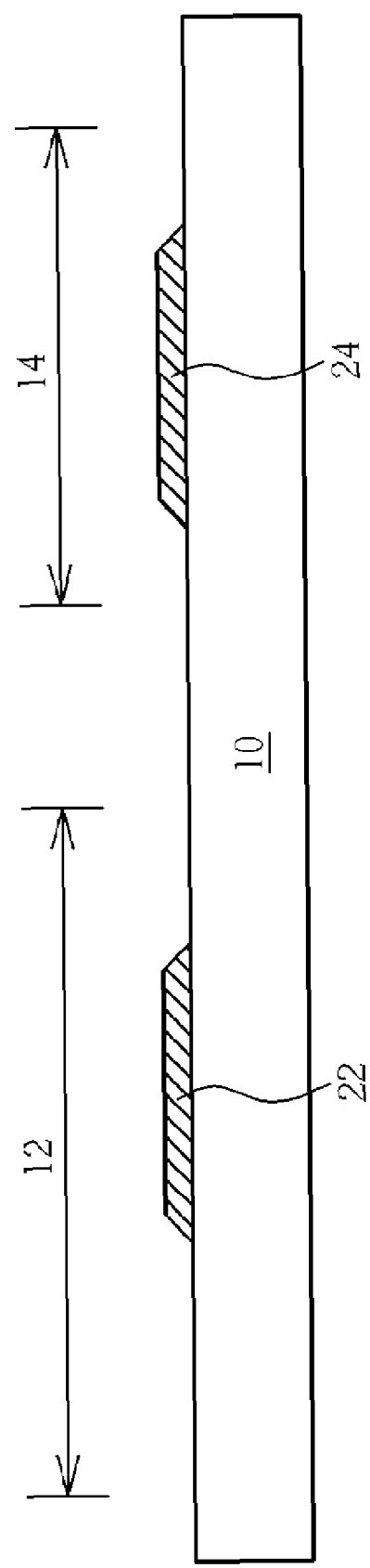
FIGS. 2-7 are cross-sectional views illustrating a method of making a pixel structure shown in FIG. 1.

The following embodiment uses a pixel structure of an amorphous silicon TFT-LCD device to illustrate the present invention, however, the pixel structure of the present invention is not limited by this embodiment and can be applied to various kinds of LCD device. Please refer to FIGS. 1-7. FIG. 1 is a top-view of a pixel structure according to a preferred embodiment of the present invention, and FIGS. 2-7 are cross-sectional views of the pixel structure shown in FIG. 1 along line AA' illustrating a method of making a pixel structure. As shown in FIG. 2, a substrate 10 is provided. The substrate 10 is a transparent substrate, such as a glass substrate, a quartz substrate or a plastic substrate. The substrate 10 has a plurality of pixel structures defined thereon, and each pixel structure includes a TFT region (active device) 12 and a data line region 14. Subsequently, a deposition process is carried out to form a conductive layer e.g. a metal layer on the substrate 10, and the conductive layer is defined by photolithography and etching techniques to form a first layer conductive pattern. The first layer conductive pattern is metal, but may also be any suitable conductive materials. The first layer conductive pattern includes a scan line 20, a gate 22 and a light-shielding pattern 24. The scan line 20 may be a straight conductive line disposed on one side of the pixel structure as shown in FIG. 1. The gate 22 is positioned in the TFT region 12 and electrically connected to the scan line 20 as shown in FIG. 1. The light-shielding pattern 24 is a floating metal, which is not electrically connected to the scan line 20 and the gate 22. The light-shielding pattern 24 can shield light beam, and therefore is used to prevent light leakage.

Figure 3:
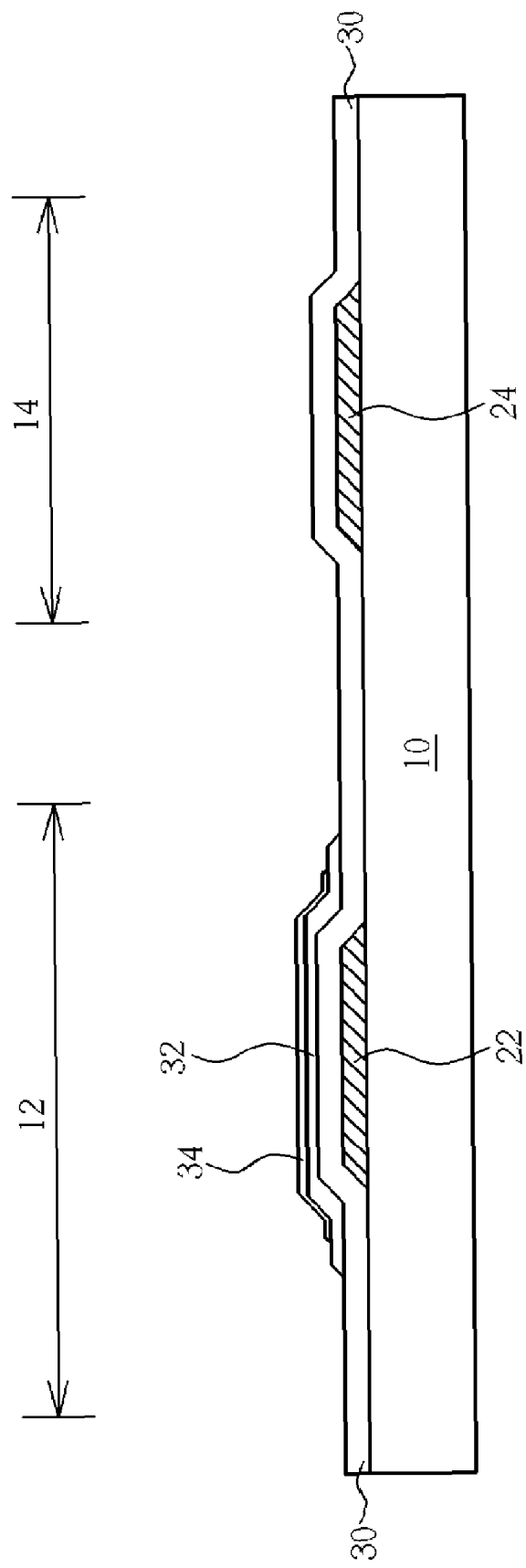

As shown in FIG. 3, an insulating layer 30 is formed on the substrate 10 and the first layer conductive pattern. The insulating layer 30 serves as gate insulating layer, and the material of the insulating layer 30 may be silicon oxide or other suitable dielectric materials. A semiconductor layer 32 and a heavily doped semiconductor layer 34 are consecutively formed on the insulating layer 30 in the TFT region 12. The semiconductor layer 32 serves as channel, and its material may be silicon e.g. amorphous silicon. The heavily doped semiconductor layer 34 is used to improve the ohmic contact between the source and drain to be formed and the semiconductor layer 32.

Figure 4:
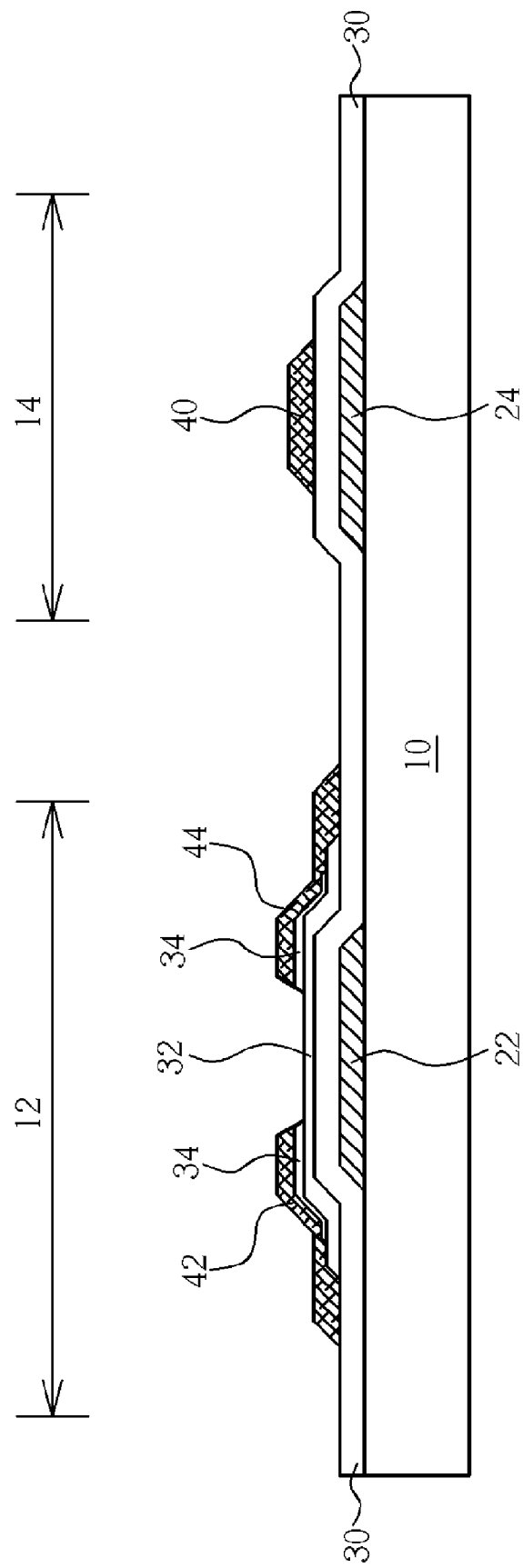

As shown in FIG. 4, a conductive layer e.g. a metal layer is deposited on the insulating layer 30, and then defined by photolithography and etching techniques to formed a second layer conductive pattern. The second layer conductive pattern is metal, but may also be any suitable conductive materials. The second layer conductive pattern includes a data line 40, a source 42 and a drain 44. The data line 40 may be a straight conductive line disposed on another side of the pixel structure, and perpendicular to and intersecting the scan line 20 as shown in FIG. 1. The data line 40 is disposed over the light-shielding pattern 24 and corresponding to the light-shielding pattern 24. In this embodiment, the width of the light-shielding pattern 24 is slightly greater than the width of the data line 40 so as to shield light beams, but the widths of the light-shielding pattern 24 and the data line 40 may be modified wherever necessary. The source 42 and the drain 44 are disposed in the TFT region 12 and respectively positioned over two opposite sides of the gate 22, corresponding to the heavily doped semiconductor layer 34 and partially overlapping with the gate 22.

Figure 5:
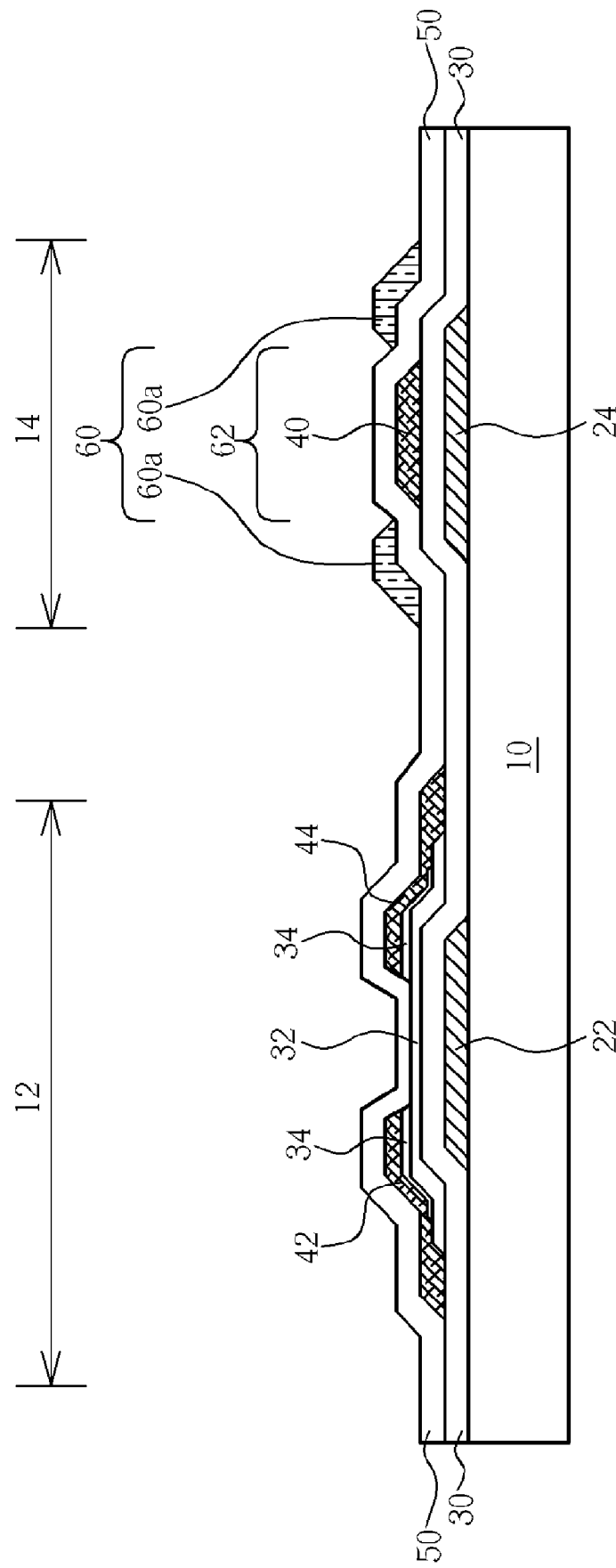

As shown in FIG. 5, a dielectric layer 50 is formed on the insulating layer 30 and the second layer conductive pattern. A conductive layer e.g. a metal layer is then deposited on the dielectric layer 50, and defined by photolithography and etching techniques to form a third layer conductive pattern. The material of the dielectric layer 50 may be inorganic material such as silicon oxide, silicon nitride, etc., or organic material. The third layer conductive pattern may be metal material or other conductive material such as indium tin oxide (ITO). The third layer conductive pattern includes a common line 61 going through the pixel structure, and a common pattern 60 structurally connected to the common line 61 as shown in FIG. 1. The common pattern 60 includes two branches 60a disposed in the data line region 14 of the pixel structure. The two branches 60a may be two stripes arranged in parallel with a space 62 disposed therebetween. The two branches 60a are respectively disposed corresponding to two opposite sides of the data line 40, the space 62 is disposed over the data line 40, and the width of the space 62 is at least greater than or equal to the width of the data line 40.

Figure 6:
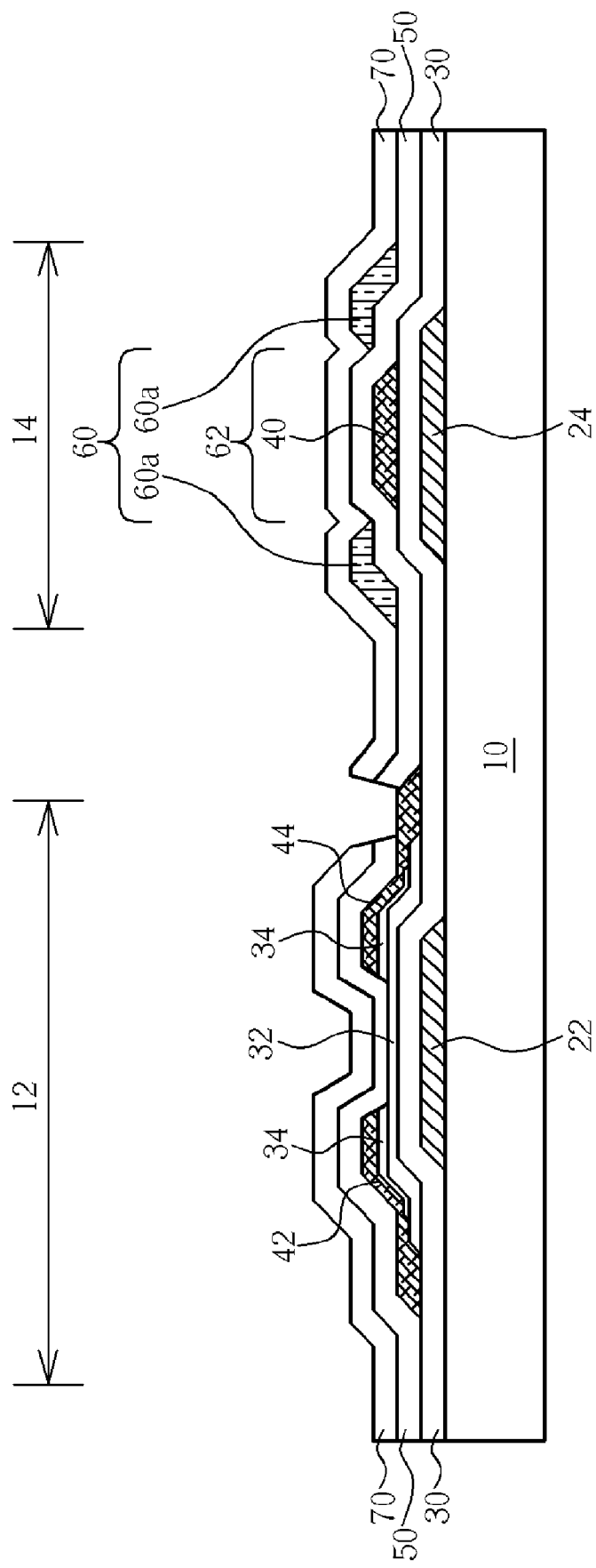
Figure 7:
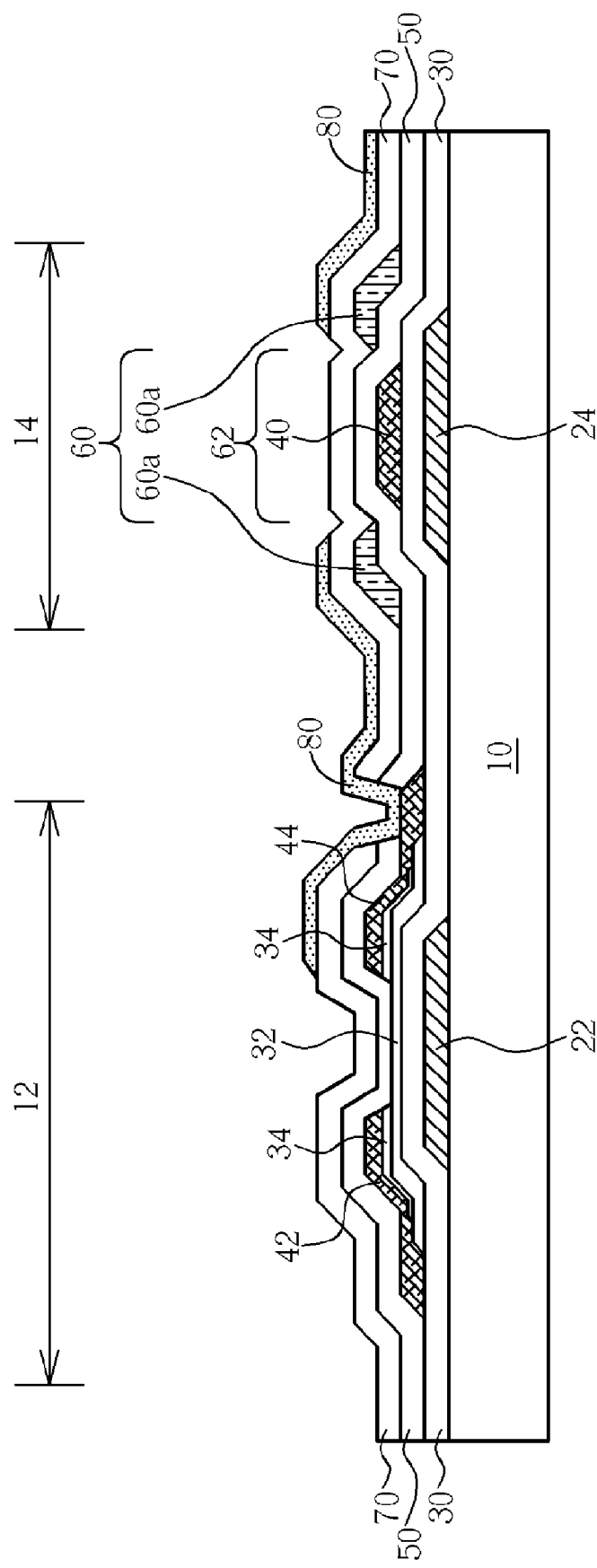

As shown in FIG. 6, at least a passivation layer 70 is formed on the dielectric layer 50 and the third layer conductive pattern, and the passivation layer 70 and the dielectric layer 50 are then partially removed to expose the drain 44. As shown in FIG. 7, a pixel electrode 80 is formed on the passivation layer 70, and the pixel electrode 80 is electrically connected to the exposed drain 44.

The pixel structure of the present invention has three metal (conductive) layers. The first layer conductive pattern has a light-shielding pattern 24, which can shield the light leakage, particularly oblique light leakage, in the regions neighboring to both sides of the data line 40 of the second layer conductive pattern. The common pattern 60 and part of the common line 61 of the third layer conductive pattern is used to shield the pixel electrode 80 and the data line 40, so that cross talk does not occur due to the parasitic capacitance between the pixel electrode 80 and the data line 40. It is appreciated that the common pattern 60 are two branches 60a with a space 62 formed therebetween, and the data line 40 is disposed corresponding to the space 62. Therefore, the parasitic capacitance between the common pattern 60 and the data line 40 is minute. In addition, the common pattern 60, the pixel electrode 80 and the passivation layer 70 disposed therebetween may form a storage capacitor, and thus excessive storage capacitance are no longer required in the display region of the pixel structure. As a result, the aperture ratio can be increased.

In this embodiment, the two branches 60a of the common pattern 60 are substantially aligned with respect to the two edges of the data line 40, and the width of the light-shielding pattern 24 is greater than the width of the data line 40. As a result, the common pattern 60 and the light-shielding pattern 24 are partially overlapping, which can also provide storage capacitance. Considering the shielding effect of the common pattern 60, the parasitic capacitor between the common pattern 60 and the pixel electrode 80 as a whole, the pixel structure of the present invention may have various configurations. Please refer to the following drawings in view of the descriptions. Note that the following drawings merely illustrate the cross-sectional view of the data line region to highlight the feature of the present invention, like elements are designated by like numerals, and not redundantly described.

Figure 8:
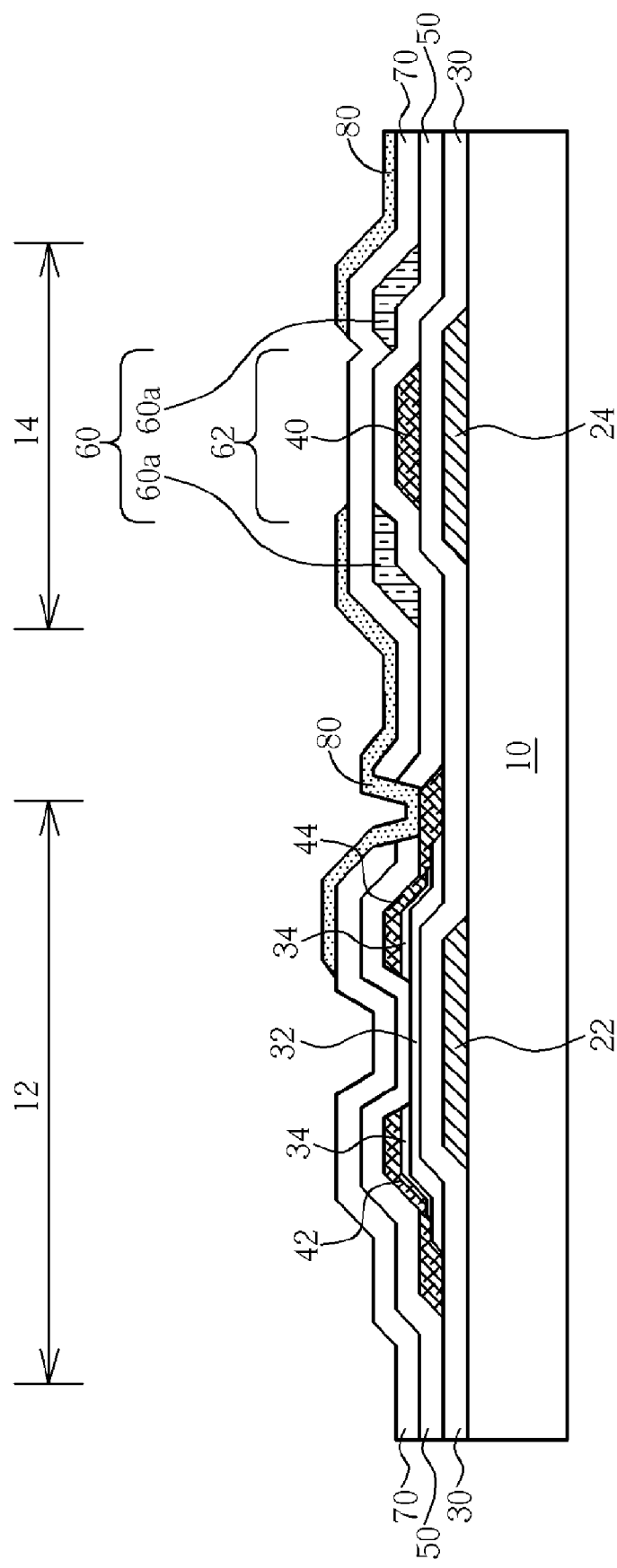
FIG. 8 is a cross-sectional view of a pixel structure according to another embodiment of the present invention.

Please refer to FIG. 8, which is a cross-sectional view of a pixel structure according to another embodiment of the present invention. As shown in FIG. 8, one of the branch 60a of the common pattern 60 is partially overlapping with one side of the data line 40, while the other branch 60a is aligned with respect to the other side of the data line 40, but not overlapping with the data line 40.

Figure 9:
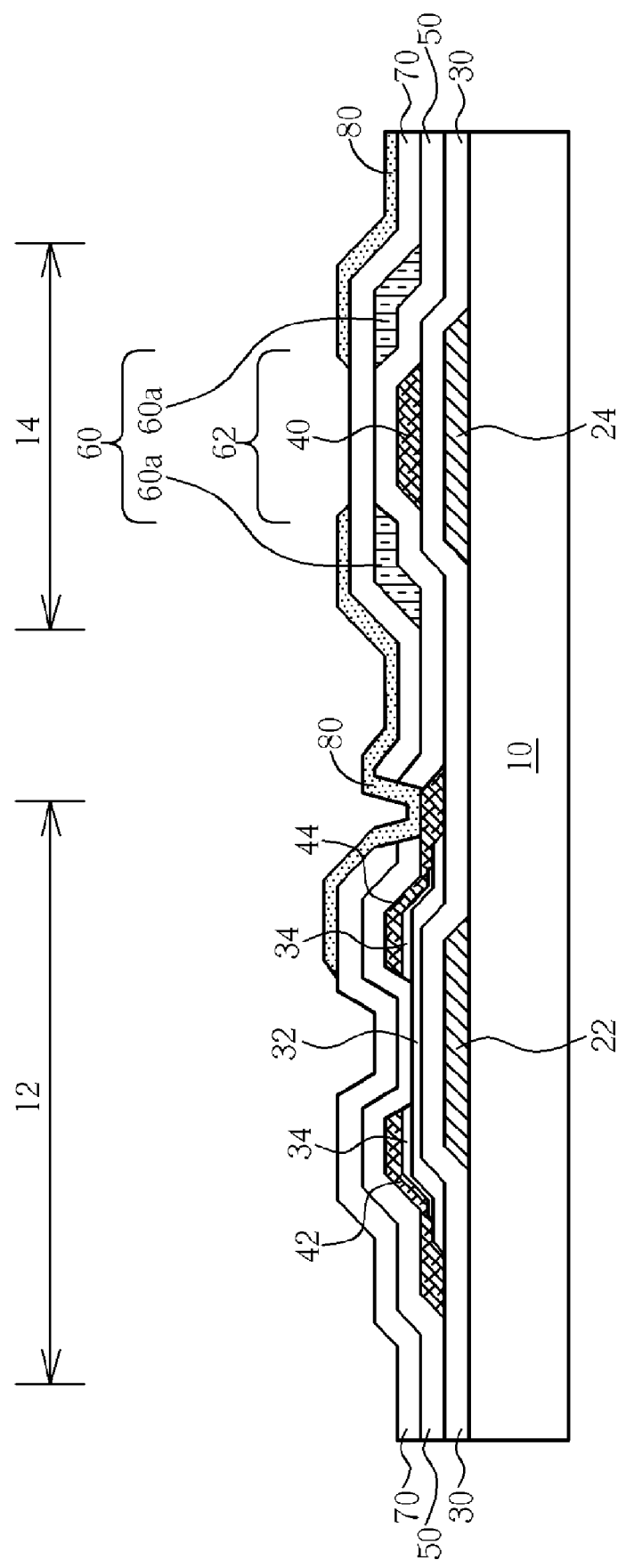
FIG. 9 is a cross-sectional view of a pixel structure according to still another embodiment of the present invention.

Please refer to FIG. 9, which is a cross-sectional view of a pixel structure according to still another embodiment of the present invention. As shown in FIG. 9, each of the two branches 60a of the common pattern 60 is partially overlapping with a corresponding side of the data line 40.

Figure 10:
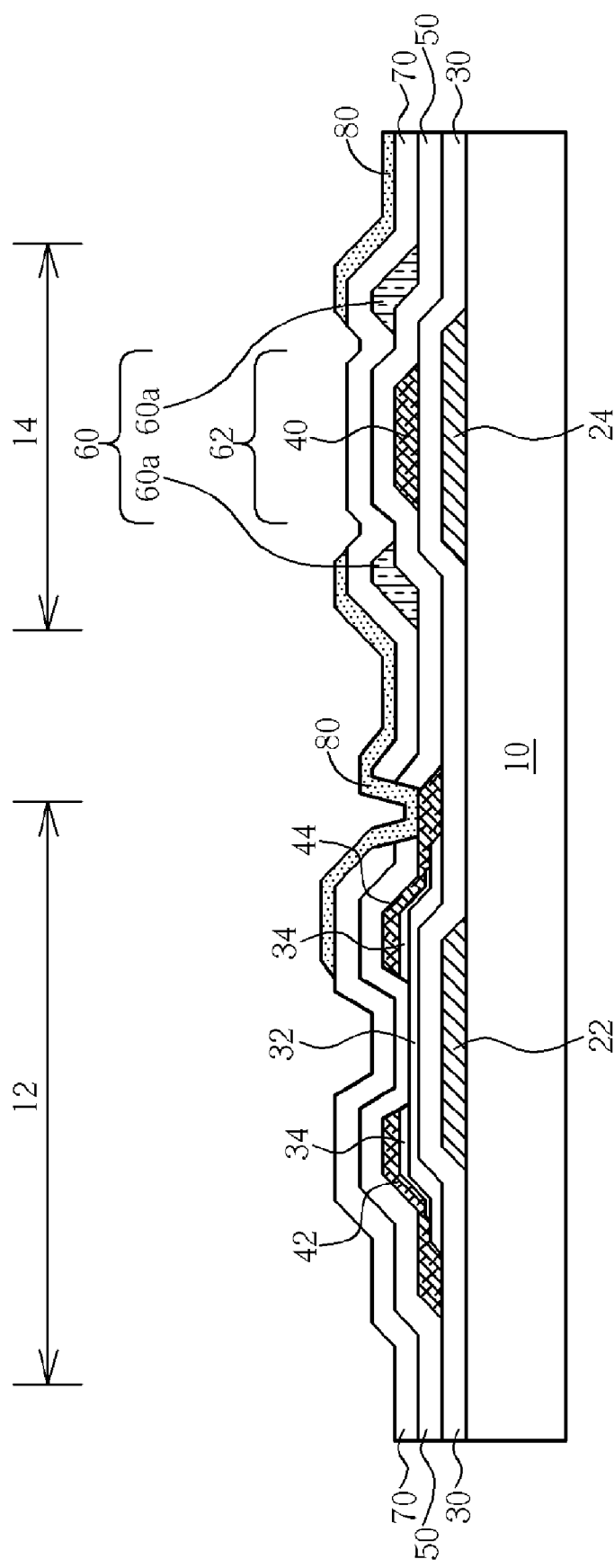
FIG. 10 is a cross-sectional view of a pixel structure according to yet another embodiment of the present invention.

Please refer to FIG. 10, which is a cross-sectional view of a pixel structure according to yet another embodiment of the present invention. As shown in FIG. 10, the two branches 60a of the common pattern 60 are not overlapping with the data line 40, and each branch 60a is distant from the data line 40 with a distance.

The aforementioned embodiments are different embodiments but not limitations of the present invention. For instance, the relative positions of the light-shielding pattern 24, the data line 40, the common pattern 60 and the pixel electrode 80 may be properly modified wherever necessary.

In conclusion, the pixel structure of the present invention uses the light-shielding pattern of the first layer conductive pattern to block the light leakage on the edges of the data line of the second layer conductive pattern, and uses the common pattern of the third layer conductive pattern to shield the parasitic capacitor between the pixel electrode and the data line. Furthermore, the branches of the common pattern have a space therebetween, which reduces cross talk due to the parasitic capacitor between the common pattern and the data line. In addition, the two branches of the common pattern, the pixel electrode and the passivation disposed therebetween can form storage capacitor so that excessive storage capacitance is no longer required in the display region of the pixel structure. This makes the pixel structure of the present invention have a very high aperture ratio.

Those skilled in the art will readily observe that numerous modifications and alterations of the device and method may be made while retaining the teachings of the invention.

What is claimed is:

1. A pixel structure, comprising:
a substrate;
a first layer conductive pattern disposed on the substrate, the first layer conductive pattern comprising a gate, a scan line, and a light-shielding pattern, wherein the gate is electrically connected to the scan line;
an insulating layer disposed on the first layer conductive pattern and the substrate;
a second layer conductive pattern disposed on the insulating layer, the second layer conductive pattern comprising a data line, a source and a drain, wherein the data line is disposed over the light-shielding pattern, and electrically connected to the source;
a dielectric layer disposed on the second layer conductive pattern and the insulating layer; and
a third layer conductive pattern disposed on the dielectric layer, the third layer conductive pattern comprising a common line and a common pattern, wherein the common pattern has two branches with a space therebetween, and the space is disposed over the data line.

2. The pixel structure of claim 1, wherein the light-shielding pattern is a floating metal.

3. The pixel structure of claim 1, wherein the light-shielding pattern has a width larger than that of the data line.

4. The pixel structure of claim 1, wherein the two branches of the common pattern are two stripes arranged in parallel.

5. The pixel structure of claim 1, wherein the space between the two branches has a width is greater than or equal to that of the data line.

6. The pixel structure of claim 1, wherein the first layer conductive pattern, the second layer conductive pattern, and the third layer conductive pattern are metal layers.

7. The pixel structure of claim 1, further comprising at least a passivation layer disposed on the third layer conductive pattern and the dielectric layer, and a pixel electrode disposed on the passivation layer, wherein the pixel electrode is electrically connected to the drain.

8. The pixel structure of claim 7, wherein the pixel electrode is substantially aligned with respect to the edges of the two branches.

9. A method of making pixel structure, comprising:
providing a substrate;
forming a first layer conductive pattern on the substrate, the first layer conductive pattern comprising a gate, a scan line and a light-shielding pattern, wherein the gate is electrically connected to the scan line;
forming an insulating layer on the first layer conductive pattern and the substrate;
forming a second layer conductive pattern on the insulating layer, the second layer conductive pattern comprising a data line, a source and a drain, wherein the data line is disposed over the light-shielding pattern, and electrically connected to the source;
forming a dielectric layer on the second layer conductive pattern and the insulating layer; and
forming a third layer conductive pattern on the dielectric layer, wherein the third layer conductive pattern comprises a common line and a common pattern, the common pattern has two branches with a space therebetween, and the space is disposed over the data line.

10. The method of claim 9, wherein the light-shielding pattern has a width greater than that of the data line.

11. The method of claim 9, wherein the light-shielding pattern is a floating metal.

12. The method of claim 9, further comprising subsequent to the third layer conductive pattern is formed, forming at least a passivation layer on the third layer conductive pattern and the dielectric layer, and a pixel electrode on the passivation layer, wherein the pixel electrode is electrically connected to the drain.

13. A pixel structure disposed on a substrate having an active device region and a data line region, the pixel structure comprising:
a first layer conductive pattern disposed on the substrate, the first layer conductive pattern comprising a gate and a light-shielding pattern, wherein the gate is disposed in the active device region, and the light-shielding pattern is disposed in the data line region;
an insulating layer disposed on the first layer conductive pattern and the substrate;
a second layer conductive pattern disposed on the insulating layer, the second layer conductive pattern comprising a data line, a source and a drain, wherein the data line is disposed over the light-shielding pattern in the data line region, the source and drain are disposed in the active device region, and the source and drain are respectively disposed over two opposite sides of the gate and partially overlapping with the gate;
a dielectric layer disposed on the second layer conductive pattern and the insulating layer, and the dielectric layer exposing the drain in the active device region; and
a third layer conductive pattern disposed on the dielectric layer in the data line region, the third layer conductive pattern is disposed over two opposite edges of the data line and overlapping with the light-shielding pattern.

14. The pixel structure of claim 13, wherein the light-shielding pattern is a floating metal.

15. The pixel structure of claim 13, wherein the light-shielding pattern has a width greater than that of the data line.

16. The pixel structure of claim 13, wherein the third layer conductive pattern are partially overlapping with two opposite sides of the data line.

* * * * *